US012003929B1

(12) United States Patent
Zhong et al.

(10) Patent No.: US 12,003,929 B1
(45) Date of Patent: Jun. 4, 2024

(54) MICROPHONE CLEANING AND CALIBRATION

(71) Applicant: Zoox, Inc., Foster City, CA (US)

(72) Inventors: Xuan Zhong, San Jose, CA (US); Arvind Pattabhiraman, Alameda, CA (US); David Donald Logan, Morgan Hill, CA (US); Nam Gook Cho, Cupertino, CA (US); Venkata Subrahmanyam Chandra Sekhar Chebiyyam, San Francisco, CA (US); Shaminda Subasingha, San Ramon, CA (US)

(73) Assignee: ZOOX, INC., Foster City, CA (US)

( * ) Notice: Subject to any disclaimer, the term of this patent is extended or adjusted under 35 U.S.C. 154(b) by 141 days.

(21) Appl. No.: 17/711,888

(22) Filed: Apr. 1, 2022

Related U.S. Application Data

(60) Provisional application No. 63/282,642, filed on Nov. 23, 2021.

(51) Int. Cl.
*H04R 29/00* (2006.01)
*B08B 7/02* (2006.01)
(Continued)

(52) U.S. Cl.
CPC .............. *H04R 29/005* (2013.01); *B08B 7/02* (2013.01); *B08B 13/00* (2013.01); *B60S 1/62* (2013.01);
(Continued)

(58) Field of Classification Search
CPC ........ H04R 29/005; H04R 1/025; H04R 1/08; H04R 1/406; H04R 3/005; H04R 2499/13; B60W 60/00; B60W 50/0205; B60W 50/0225; B60W 50/06; B60W 2555/20; B60W 2050/021; B08B 7/02; B08B 13/00; B60S 1/62

See application file for complete search history.

(56) References Cited

U.S. PATENT DOCUMENTS

2020/0213728 A1\* 7/2020 Lopatka ................ G01S 3/8083
2022/0187448 A1\* 6/2022 Shand ................... G01S 13/931

FOREIGN PATENT DOCUMENTS

DE 102019204209 A1 \* 10/2020 ............. H04R 29/00
DE 102019211331 A1 \* 2/2021 ........... H04R 29/006

OTHER PUBLICATIONS

Machine Translation of DE102019204209, Schoenrock et al. (Year: 2020).\*

(Continued)

*Primary Examiner* — Andrew L Sniezek
(74) *Attorney, Agent, or Firm* — Lee & Hayes P.C.

(57) ABSTRACT

Techniques for cleaning and calibrating a microphone are discussed herein. For example, a computing device can implement a microphone component to operate a speaker adjacent to a microphone to cause removal of an obstruction (e.g., rain, mud, dirt, dust, snow, ice, animal droppings, etc.) on or near the microphone. The microphone component can also or instead cause the speaker to output a frequency for testing operation of the microphone. By implementing the cleaning and/or calibrating techniques described herein, foreign particle(s) of varying size and type can be dislodged from an area near the microphone to improve performance of the microphone.

20 Claims, 5 Drawing Sheets

(51) Int. Cl.
*B08B 13/00* (2006.01)
*B60S 1/62* (2006.01)
*B60W 50/02* (2012.01)
*B60W 50/06* (2006.01)
*B60W 60/00* (2020.01)
*H04R 1/02* (2006.01)
*H04R 1/08* (2006.01)
*H04R 1/40* (2006.01)
*H04R 3/00* (2006.01)

(52) U.S. Cl.
CPC .... *B60W 50/0205* (2013.01); *B60W 50/0225* (2013.01); *B60W 50/06* (2013.01); *B60W 60/00* (2020.02); *H04R 1/025* (2013.01); *H04R 1/08* (2013.01); *H04R 1/406* (2013.01); *H04R 3/005* (2013.01); *B60W 2050/021* (2013.01); *B60W 2555/20* (2020.02); *H04R 2499/13* (2013.01)

(56) References Cited

OTHER PUBLICATIONS

Machine Translation of DE102019211331 Strobel et al. (Year: 2021).*

* cited by examiner

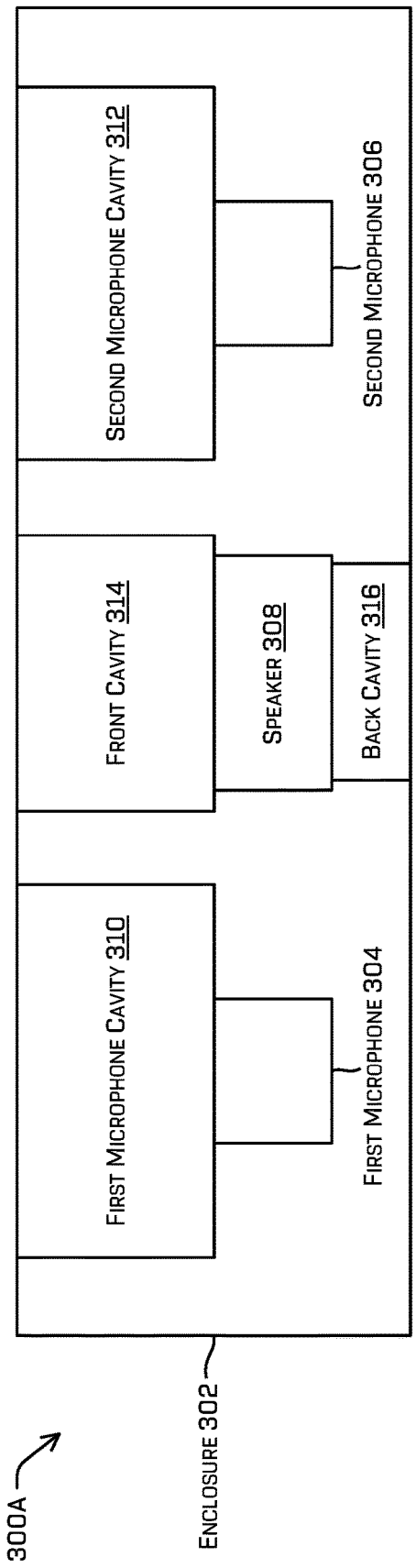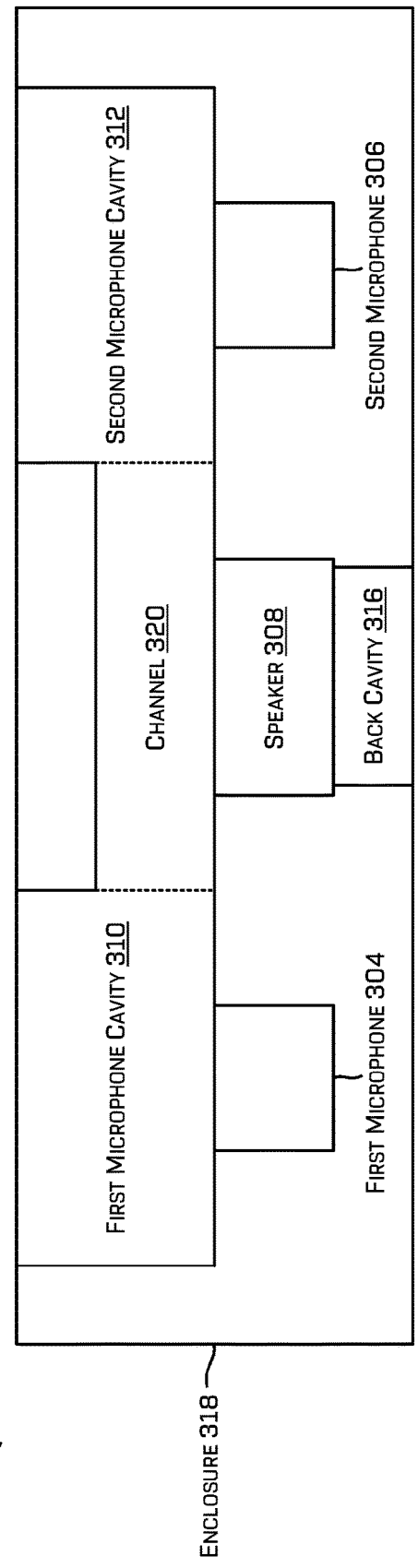

MICROPHONE CLEANING AND CALIBRATION

RELATED APPLICATION

This application claims priority to U.S. Provisional Application No. 63/283,642, filed Nov. 23, 2021, titled "Microphone Cleaning and Calibration," the entirety of which is incorporated herein by reference for all purposes.

BACKGROUND

A vehicle can use sensors to capture sensor data to detect objects in an environment. Accurate determinations of object characteristics can assist, for example, an autonomous vehicle to traverse the environment. However, the quality of the data collected by sensors may become degraded in certain circumstances, including based on environmental factors such as weather, traffic, or road conditions, as well as based on internal errors or malfunctions that may occur within the sensors themselves. In such cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is an illustration of an example speaker system for implementing the techniques described herein.

FIG. 3B is another illustration of an example speaker system for implementing the techniques described herein.

DESCRIPTION

Figure 1:
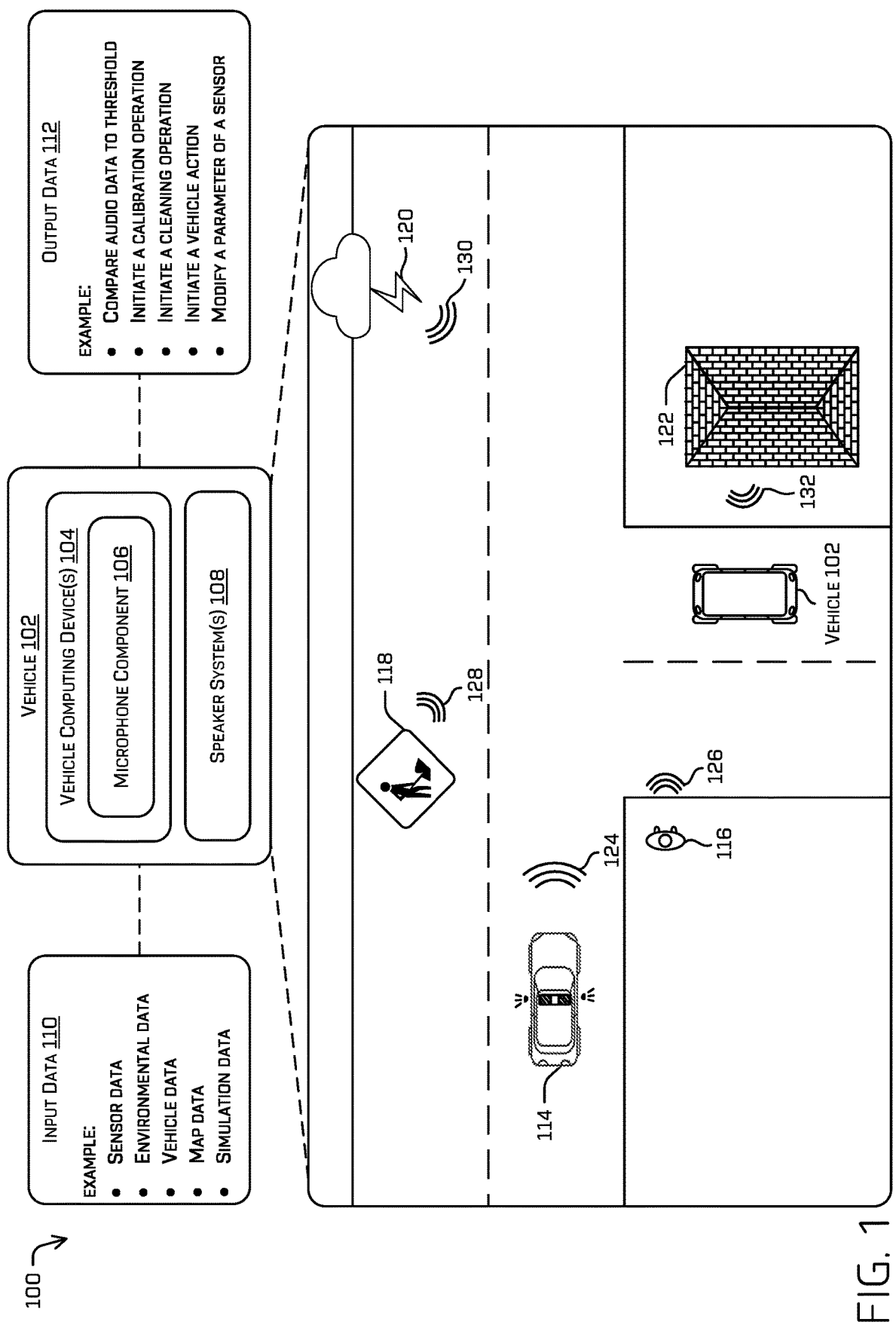
FIG. 1 is an illustration of an example environment, in which an example vehicle applies a microphone component and/or a speaker system to implement the techniques described herein.

Techniques for cleaning and calibrating a microphone are discussed herein. The techniques may include a speaker outputting an audio signal that cleans water or other debris from an area proximate the microphone and/or is usable for microphone calibration. For instance, a computing device can implement an microphone component to detect a weather event (e.g., rain, mud, dirt, dust, snow, ice, etc.) on a surface surrounding the microphone (e.g., a mesh of holes in front of the microphone, an exterior surface of a vehicle housing the microphone, etc.). The microphone component can cause a speaker to emit a signal directed towards the microphone and determine presence of the weather event based on comparing the frequency or waveform of the signal to a frequency or waveform detected by the microphone. Based on the determination of the weather event, the microphone component can initiate a cleaning operation to remove the rain, snow, etc. associated with the weather event and/or calibrate the microphone using a same or different frequency. Using the techniques described herein, an obstruction affecting operation of the microphone operating on an autonomous vehicle can be mitigated and/or one or more actions can be performed (e.g., determine a vehicle trajectory, modify perception operations to reduce reliance on the portion of the sensor that is obstructed, operate the vehicle in one direction, pull the vehicle over, initiate a communication to a remote operator for assistance, etc.). By implementing the techniques described herein, safety of the autonomous vehicle can be improved by performing a cleaning operation and/or a calibration operation to enable the microphone to "hear" an environment.

Generally, the cleaning and calibration techniques can include operating a speaker to produce a resonant frequency that causes vibration on a surface adjacent to a microphone. For example, the speaker can generate a frequency that is tuned to cause rain (or other obstruction) to be removed from an opening (e.g., a mesh, grill, baffle, etc. having one or more holes), or other surface, proximate the microphone. By implementing the techniques described herein, foreign particle(s) of varying size and type can be dislodged from an area near the microphone to improve performance of the microphone. In this way, a robotic device coupled to the microphone, such as an autonomous vehicle, can operate safely in environments having different types of weather.

In the context of an autonomous vehicle, sensor data from one or more sensors can detect different types of weather occurring proximate to the autonomous vehicle. The microphone component can initiate a calibration operation or a cleaning operation based at least in part on the sensor data indicating the occurrence of the weather. For instance, based on the sensor data, the calibration operation can be performed to verify that the microphone is operating above a quality threshold and/or the cleaning operation can be performed to clean at least a portion of an area surrounding the microphone. In other examples, the microphone component can initiate calibration and/or cleaning operations periodically (e.g., at a predetermined time) independent of the sensor data.

In some examples, the speaker can be included in an enclosure of an autonomous vehicle (or other robotic device) that also includes one or more microphones. For example, the speaker can be in a cavity inside an exterior surface of the autonomous vehicle, and a pair of microphones can also be included in the cavity. In various examples, a conduit(s) can connect the speaker to the pair of microphones to enable air from the speaker to pass through the conduit to an area adjacent to each microphone. In this way, air pressure produced from the speaker can reach the area of the microphone to cause rain or other particles on the area to be expelled by the air pressure (or vibrations thereof). In some examples, the air pressure can represent an air volume velocity caused by an amplitude of an audio signal output by the speaker.

The conduit can, in some examples, include a first partition to a first microphone and a second partition to a second microphone, and the microphone component can selectively operate the first partition and the second partition to cause an output from the speaker to reach the first microphone and/or the second microphone. If, for example, the first microphone is associated with a lower calibration score than the second microphone, the second partition can be closed to cause additional air pressure to pass through the conduit to the first microphone (versus both partitions being "open"). However, in other examples, the cleaning and calibration techniques can be performed without the conduit or partitions.

In various examples, dimensions of the conduit can cause, during the cleaning operation, a pressure difference between the conduit and an opening adjacent the microphone. The opening can represent one or more holes associated with a mesh, grill, baffle, or surface through which audio signals are designed to reach the microphone. In some examples, the conduit comprises a shape and a size to cause the speaker to emit a first frequency to calibrate the microphone and a second frequency different from the first frequency to remove debris from the opening adjacent the microphone. The conduit can, for instance, produce a resonate frequency during output of an audio signal from the speaker based at least in part on a size of a hole(s) in the opening.

As mentioned, the speaker and the one or more microphones can be located in an enclosure (or cavity) of an autonomous vehicle. In various examples, the enclosure has a volume that is tuned to cause a pressure difference between the enclosure and an outer surface of the autonomous vehicle during operation of the speaker. For example, a speaker can operate at a frequency range that causes air pressure to push or vibrate obstacles on the outer surface for removal. The outer surface can include a plurality of holes for the microphone in the enclosure to receive audio signals from an environment of the autonomous vehicle. For instance, rain in the holes of the outer surface can be cleaned based at least in part on the frequency range output by the speaker inside the enclosure. By performing the cleaning techniques, the autonomous vehicle can improve microphone audio detection associated with objects in the environment (e.g., an emergency vehicle, a pedestrian, an animal, etc.).

In various examples, the microphone component can cause the speaker to emit a first frequency range to perform a cleaning operation, and a second frequency range to perform a calibration operation. For example, the speaker can output a first frequency range that causes maximum air pressure (e.g., maximum airflow velocity) and/or vibration based on a size of the enclosure and a size of the speaker. The second frequency range can be output by the microphone component to calibrate the microphone (e.g., in a range of frequencies associated with an emergency vehicle or other object)

In one specific example, sensor data associated with one or more sensors of an autonomous vehicle can determine presence of a weather event that includes water below a threshold temperature, and the microphone component can send a signal to a heating element to cause heat to be directed towards an area proximate the microphone. In this way, the snow, ice, etc. can evaporate and the liquid can be removed from the microphone during a cleaning operation thereby improving operation of the microphone.

The microphone component can determine a calibration score based on a calibration operation while in other examples the microphone component can receive a calibration score from another component of the vehicle computing device. Based at least in part on the calibration score, the microphone component can determine a degree of obstruction (e.g., water coverage) for an area adjacent the microphone, and perform the cleaning operation and/or the calibrating operation based at least in part on the degree of the obstruction (e.g., an amount of water coverage).

In examples with two or more microphones, the microphone component can determining a first direction of arrival (or time of arrival) relative to a first microphone and a second direction of arrival (or time of arrival) relative to a second microphone, and determine a difference between the first direction or time of arrival associated with first microphone and the second direction or time of arrival associated with the second microphone. In such examples, the microphone component can initiate a cleaning operation and/or a calibration operation based at least in part on the difference in the direction of arrivals (or time of arrivals) of the two microphones. For instance, at least one of the microphones can be cleaned responsive to the difference in the direction of arrival being above a difference threshold.

In some examples, the microphone component can cause a speaker to output a first audio signal from a speaker into a conduit connecting the speaker to a microphone, and detect, by the microphone, a second audio signal. In such examples, the microphone component can determine a difference between the first audio signal and the second audio signal, and based at least in part on the difference, determine a probability associated with water covering an opening adjacent to the microphone. The microphone component can perform an action (e.g., initiate a cleaning operation and/or a calibration operation) based at least in part on the probability meeting or exceeding a threshold.

In some examples, an output from the microphone component can be transmitted to a vehicle computing device to cause a vehicle to be controlled in an environment. A calibration score resultant from performing a calibration operation and/or a cleaning status resultant from performing a cleaning operation can be used to cause the vehicle to navigate to a safe location, receive assistance from a teleoperator (e.g., a remote computing device), alter a perception component to reduce reliance on one microphone in favor of other available microphones and/or sensors, etc. Relatively low calibration scores and/or an inability to clean the microphone can cause the vehicle to relay on other microphones, sensors, and the like.

In some examples, the microphone component can be included in a vehicle computing device of an autonomous vehicle that is bi-directional (a front region can change depending upon a direction of travel). By way of example and not limitation, detecting an obstruction on a microphone coupled to a front region or rear region of the autonomous vehicle can cause the autonomous vehicle to operate in a single direction that minimizes reliance on the obstructed microphone to improve safety. For instance, in an environment with relatively strong wind and rain, sensors in the front region or the rear region can be impacted differently, and detecting an obstruction on the microphone in the front region or the rear region can be used to determine a direction of travel that optimizes performance of available microphones. In other words, the autonomous vehicle can be controlled in the environment by determining a direction of travel for the autonomous vehicle based at least in part on a calibration score for a microphone (e.g., indicating an effectiveness of a cleaning operation).

In some examples, sensor data from the vehicle computing device can be used to determine when to perform a test (e.g., a calibration operation and/or a cleaning operation). A microphone can be cleaned based at least in part on environmental conditions (e.g., wind, rain, snow, etc.) and/or a direction of travel of the vehicle, for example. In the example that the bi-directional vehicle operates in one direction due to wind and rain, a cleaning operation can be initiated by the microphone component to clean the microphone(s) obstructed by rain, and a calibration operation can be initiated to calibrate the microphone(s) before or after the cleaning operation.

In some examples, some or all of the aspects of the techniques for cleaning and calibrating a microphone can be performed by a machine learned model (e.g., a neural network, a convolutional neural network, a recurrent neural network, a graph neural network, and the like) trained to perform the particular technique. A machine learned model can be trained based on data manually or automatically annotated to an obstruction associated with a microphone, and the like. For instance, the machine learned model can receive annotated data as ground truth representing signal information associated with an obstruction. The ground truth can include expected signal values for different weather events to enable the machine learned model to determine whether audio data received by a microphone is or is not associated with a particular obstruction type.

The cleaning and calibrating techniques described herein can improve a functioning of a computing device by determining a level of obstruction associated with a microphone and cleaning the microphone to maintain safe microphone performance. For example, determining whether a microphone is properly operating can allow subsequent processes associated with an autonomous vehicle (e.g., classification, tracking, prediction, route planning, trajectory generation, and the like) to be performed more accurately, may require less processing power, and/or may require less memory. In some instances, faster and/or more accurate audio detection can be used in generating a trajectory of the autonomous vehicle, which can improve safety for occupants of an autonomous vehicle. In some examples, the techniques can be used in a self-test operation associated with a system to evaluate a performance of the system which provides for greatly improved overall reliability and safety outcomes. Further, the techniques discussed herein may be incorporated into a system that can be validated for safety.

FIG. 1 is an illustration of an example environment 100, in which an example vehicle applies a microphone component and/or a speaker system to implement the techniques described herein. For example, a vehicle 102 can include one or more vehicle computing device(s) 104 implementing a microphone component 106 that is configured to initiate cleaning and/or calibration of one or more microphones coupled to the vehicle 102. In some examples the cleaning and/or the calibration techniques described herein can include a speaker system(s) 108 (also referred to as the speaker 108) to emit an audio signal that causes an obstruction to be removed from an area adjacent to a microphone (also referred to as an audio sensor). In various examples, the speaker 108 can also or instead emit an audio signal at a particular frequency usable to test performance of the microphone.

Generally, the vehicle computing device(s) 104 (also referred to as the vehicle computing device) can implement one or more components to detect, infer, estimate, or otherwise determine audio data representing sound in the environment 100. For example, audio signals may be received by one or more microphones coupled to the vehicle 102. The audio signals can, for instance, be associated with an object in the environment 100 and/or the speaker system(s) 108. The vehicle computing device(s) 104 can identify, based on the audio signals, degradation associated with at least one of the one or more microphones, and initiate an action to mitigate the degradation. By processing various types of input data 110, the vehicle computing device(s) 104 can determine output data 112 representing possible actions for the vehicle 102. In one specific example, the vehicle computing device(s) 104 can receive the input data 110 representing audio data in the environment 100 and determine the output data 112 to initiate a cleaning operation, a calibration operation, and or another action associated with an audio sensor of the vehicle 102.

In various examples, the vehicle computing device 104 can receive sensor data representing audio of the environment 100 via a perception component (e.g., the perception component 422). In some examples, the vehicle computing device 104 can implement the microphone component 106 to receive sensor data emitted from the speaker system(s) 108 and/or captured by a sensor system (e.g., the sensor system(s) 406).

In some examples, the vehicle computing device 104 can be configured to receive sensor data representing an object, different types of weather, or other characteristics of the environment 100. For instance, the sensor data captured by one or more sensor(s) mounted on the vehicle 102 and/or remote from the vehicle 102 can be sent to one or more components of the vehicle computing device 104. Example sensor(s) can include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other vehicles (e.g., a fleet of autonomous vehicles). The data may include sensor data, such as audio data associated with the environment 100.

In some examples, the vehicle computing device 104 may be configured to detect an object in the environment 100, such as object 114 (e.g., an emergency vehicle), object 116 (e.g., a pedestrian), object 118 (e.g., a construction zone), object 120 (e.g., thunder), and object 122 (e.g., a building). For example, the vehicle computing device 104 can receive the sensor data over time and/or in real-time such as via a perception component (e.g., the perception component 422), and can semantically classify the detected objects (e.g., determine an object type), such as, for example, whether the object is a vehicle, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like.

In some examples, the vehicle computing device 104 may be configured to receive, detect, infer, estimate, or otherwise determine first audio data representing sound 124 from the emergency vehicle 114, second audio data representing sound 126 from the pedestrian 116, third audio data representing sound 128 from the construction zone 118, fourth audio data representing sound 130 from the thunder 120, fifth audio data representing sound 132 from the building 122, as shown in FIG. 1. The sound 124 may comprise a siren sound emitted by the emergency vehicle 114 in varying frequency and/or sound intensity. The sound 126 associated with the pedestrian 116 may represent screaming, shouting, or other human sound that varies in frequency and/or intensity. The sound 128 associated with the construction zone 118 may represent construction noise such as a power tool or a collective sound of the construction area. The sound 130 associated with the thunder 120 may represent thunder sounds in varying type. The sound 132 associated with the building 122 may represent sounds originating from the building 122 and/or sounds reflected off the building 122.

In some examples, any one of the sounds (124, 126, 128, 130, and/or 132) can be distinguished from being a direct sound or a reflected sound. Additional details of determining direct or reflected sounds are described in U.S. patent application Ser. No. 16/836,605, filed Mar. 31, 2020, entitled "Distinguishing Between Direct Sounds and Reflected Sounds in an Environment," which is incorporated herein by reference in its entirety and for all purposes.

Generally, the microphone component 106 can represent functionality to operate the speaker system(s) 108 to clean or calibrate the one or more microphones to ensure that the vehicle computing device 104 is accurately "hearing" the environment 100. For example, the microphone component 106 can determine a signal (e.g., a frequency, wavelength, etc.) for output by the speaker system(s) 108 to clean an obstruction (e.g., rain, mud, dirt, dust, snow, ice, etc.) from a surface or opening near at least one of the one or more microphones. The surface near the microphone can represent a mesh of holes in front of the microphone and/or a mesh of holes in an exterior surface of the vehicle 102 housing the microphone. In some examples, the cleaning operation can include the speaker(s) generating a frequency that is tuned to cause rain (or another obstruction type) to be removed from an opening (e.g., a mesh, grill, baffle, etc. having one or more holes), or other surface, proximate the microphone. The microphone component 106 can determine, for example, a resonant frequency for sending to the speaker that causes vibration on the surface or the opening adjacent to the microphone. The resonant frequency can be determined based at least in part on a number of holes associated with the surface, mesh, grill, baffle, etc. In this way, the microphone component 106 can be implemented to cause foreign particle(s) of varying size and type to be dislodged from an area near the microphone thereby improving performance of the microphone (e.g., detection of the sounds 124, 126, 128, 130, and/or 132 can be improved relative to not implementing the microphone component 106).

In some examples, the microphone component 106 can determine a signal for output by the speaker 108 to calibrate at least one of the one or more microphones. For instance, the microphone component 106 can determine a frequency of an audio signal for output by one or more speakers to test performance of the microphone. In various examples, the microphone component 106 can cause the speaker system(s) 108 to output a first audio signal at a first frequency and detect or otherwise receive a second audio signal detected by the microphone being tested. In some examples, the microphone component 106 can determine a difference between frequency information of the first audio signal and the second audio signal and verify that the microphone is operating properly based at least in part on the difference meeting or exceeding a quality threshold. In some examples, the microphone component 106 can compare sound information associated with the second audio signal to the quality threshold to ensure that second audio signal detected by the microphone is within the quality threshold.

In some examples, the microphone component 106 can initiate a calibration and/or a cleaning operation based at least in part on sensor data indicating a weather event in the environment 100. For example, a component (e.g., the perception component 422) of the vehicle computing device 104 can determine presence of the weather event (e.g., rain, mud, dirt, dust, snow, ice, etc.) based at least in part on the input data 110, and the microphone component 106 can initiate a cleaning operation to remove the rain, snow, etc. associated with a detected weather event and/or calibrate the microphone using a same or different frequency. In some examples, sensor data (e.g., audio data, image data, etc.) associated with the sensor(s) can detect different types of weather proximate the vehicle 102 and send data representing the weather event to the microphone component 106.

In some examples, the microphone component 106 may initiate a calibration and/or a cleaning operation at a predetermined time independent of the sensor data. For example, the calibration and/or the cleaning operation can be initiated at a particular time (e.g., a particular time of day, after expiration of a predetermined time period, a time at which the vehicle is at a particular position in the environment 100, etc.). In some examples, the microphone component 106 can cause the speaker system(s) 108 to output audio data usable for detecting an obstruction associated with microphone after expiration of a time period (e.g., every three hours, fifteen minutes, or other timeframe). In some examples, the microphone component 106 can determine a calibration score (e.g., a microphone score) indicating whether the microphone is properly calibrated (e.g., the microphone is calibrated within a threshold range) and/or a cleaning status indicating a degree of obstruction near the microphone. Additional detail of the cleaning and calibration operations using a speaker positioned adjacent a microphone is discussed throughout this disclosure, including in FIGS. 2-5.

In some examples, an output (e.g., an indication to initiate a cleaning operation, indication to initiate a calibration operation, a calibration score (e.g., calibration data), a cleaning status (e.g., cleaning data), or other determination) from the microphone component 106 can be transmitted to another component of the vehicle computing device 104 to cause the vehicle 102 to be controlled in the environment 100. In other words, the vehicle computing device 104 may determine an action for the vehicle 102 based at least in part on an output (e.g., the output data 112) from the microphone component 106. For instance, a calibration score resultant from performing a calibration operation and/or a cleaning status resultant from performing a cleaning operation can be used to cause the vehicle to navigate to a safe location, receive assistance from a teleoperator (e.g., a remote computing device), alter a perception component to reduce reliance on one microphone in favor of other available microphones and/or sensors, etc. Relatively low calibration scores and/or an inability to clean the microphone can cause the vehicle to relay on other microphones, sensors, and the like.

In various examples, one or more components of the vehicle 102 can be used to determine a direction of arrival (DoA) of an audio event relative to the vehicle 102. Additional details of determining a direction of arrival for a sound are described in U.S. patent application Ser. No. 17/077,746, filed Oct. 22, 2020, entitled "Emergency Vehicle Localization," which is incorporated herein by reference in its entirety and for all purposes.

The speaker system(s) 108 can represent one or more speakers positioned proximate one or more microphones of the vehicle 102. For instance, the speaker system(s) 108 can be located in a same enclosure and/or cavity as a microphone (or pair of microphones). In some examples, the enclosure and/or the cavity housing at least one speaker and at least one microphone can be integrated into a body of the vehicle 102. Additional detail of the speaker system(s) is discussed throughout this disclosure including in FIGS. 3A and 3B.

As mentioned, the vehicle computing device(s) 104 can process the input data 110 to determine the output data 112 representing possible actions available to the vehicle 102. In some examples, the input data 110 can represent sensor data environment data, vehicle data, map data, simulation data. etc. The input data can be associated with audio data, image data, video data, lidar data, radar data, or other sensor data, etc., that is associated with a value (e.g., a desired classification, inference, prediction, etc.). For instance, the input data 110 can represent sensor data from one or more sensors coupled to the vehicle 102, simulation data from a simulation involving the vehicle 102, log data (e.g., data representing determinations over time), and/or data representing a desired scenario, such as manually specified data from a user input into a user interface. The input data 110 may also or instead be associated with subsystems that monitor vehicle health (e.g., operation of the drive system, braking system, battery system, and the like), passenger comfort, and/or ride service applications, just to name a few.

As mentioned above, the input data 110 can also or instead be simulation data (e.g., data associated with a simulation performed by a computing device to test safety of the vehicle 102). In various examples, the vehicle computing device(s) 104 can determine the output data 112 based at least in part on top-down multi-channel data indicative of a top-down representation of an environment. The top-down representation may be determined based at least in part on map data and/or sensor data captured from or associated with a sensor of the vehicle 102 in the environment 100, and may represent a top-down view of the environment to capture context of the vehicle 102 (e.g., identify actions of other objects such the emergency vehicle 114, the pedestrian 116, the construction zone 118, and so on, relative to the vehicle 102.

In some examples, the input data 110 can represent data output over time by one or more of: a localization component (e.g., the localization component 420), a perception component (e.g., the perception component 422), a prediction component (e.g., the prediction component 424), and a planning component (e.g., the planning component 426), though other components or data sources are also contemplated. In various examples, the input data 110 received by the vehicle computing device(s) 104 may represent object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle). The input data 110 may also include, in some examples, two-dimensional image data (e.g., top-down multi-channel "image" data indicative of a top-down representation of an environment) or three-dimensional image data that includes bounding box(es) to represent object(s) in the environment 100.

Generally, the output data 112 can represent data associated with a component that changes based on the input data 110 that is used as input. The output data 112 generated by the vehicle computing device(s) 104 can represent data associated with audio, a cleaning operation, a calibration operation, a parameter of sensor (e.g., a microphone), a vehicle action, and the like. By way of example and not limitation, the output data 112 can indicate that audio data captured by a microphone is below a quality threshold and that calibration or cleaning using the speaker system(s) 108 can improve the microphone performance in the future.

In some examples, the vehicle computing device 104 can be configured to receive, detect, infer, estimate, or otherwise determine one or more paths for the vehicle 102 and/or each detected object. For instance, the vehicle computing device 104 can determine a trajectory (e.g., direction, speed, acceleration, etc.) for the vehicle 102 to traverse the environment 100. In some examples, the vehicle computing device 104 may estimate positions of the object(s) in the environment based on a detected trajectory and/or predicted trajectories associated with the object(s). In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, a machine learned model may utilize machine learning, linear or signal temporal logic, tree search methods, heat maps, and/or other techniques for determining predicted trajectories and/or estimated positions of object(s) and/or the vehicle 102.

Using the techniques described herein, an obstruction affecting operation of the microphone operating on the vehicle 102 can be mitigated and/or one or more actions can be performed (e.g., determine a vehicle trajectory, modify perception operations to reduce reliance on the portion of the sensor that is obstructed, operate the vehicle in one direction, pull the vehicle over, initiate a communication to a remote operator for assistance, etc.). By implementing the techniques described herein, safety of the vehicle 102 can be improved by performing a cleaning operation and/or a calibration operation to enable the microphone to "hear" an environment. For example, subsequent determinations that rely on audio data, such as determining a direction of arrival of sound, can be improved by cleaning and/or calibrating the microphone as described herein.

Figure 2:
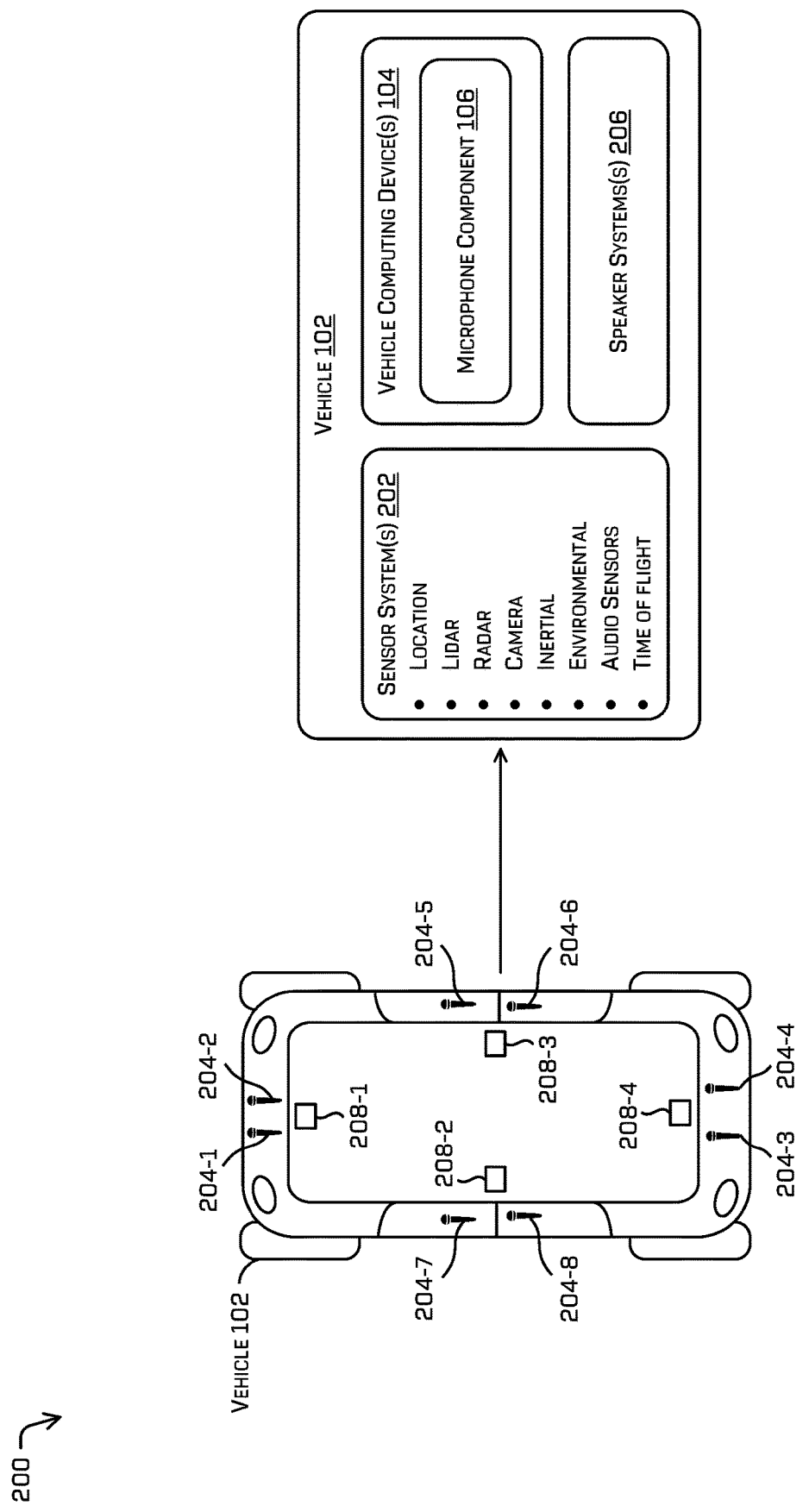
FIG. 2 is an illustration of an example vehicle for implementing the techniques described herein.

FIG. 2 is a block diagram of an example vehicle 200 for implementing the techniques described herein. As illustrated in FIG. 2, the example vehicle 200 (vehicle 102) may include sensor system(s) 202 disposed on the vehicle 102 including one or more audio sensors (e.g., 204-1, 204-2, 204-3, 204-4, 204-5, 204-6, 204-7, and 204-8) that generate audio data representing sound in an environment associated with the vehicle 102. In some examples, the environment associated with the vehicle 102 can include a real-world environment and/or a simulated environment associated with a representation of the vehicle 102. FIG. 2 also illustrates one or more speaker system(s) 206 (e.g., 208-1, 208-2, 208-3, and 208-4) associated with the one or more audio sensors.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle 102 at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle 102 can include sensor system(s) 204 disposed on the vehicle 102. The sensor system(s) 204 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., audio sensors 204-1, 204-2, 204-3, 204-4, 204-5, 204-6, 204-7, and 204-8), environment sensors (e.g., temperature sensors, humidity sensors, light sensors, pressure sensors, etc.), etc. The sensor system(s) 204 can generate sensor data, which can be utilized by vehicle computing device(s) 104 associated with the vehicle 102.

In at least one example, the vehicle computing device(s) 104 may determine a direction of arrival (DoA) and/or a time of arrival of an audio source in the environment based at least in part on audio data received from the sensor system(s) 204 associated with the vehicle 102. The audio data, i.e., the raw audio data, from the audio source(s) in the environment of the vehicle 102 may be collected, captured, received, or otherwise determined by the audio sensor(s) 204-1, 204-2, 204-3, 204-4, 204-5, 204-6, 204-7, and 204-8. The raw audio data or the raw data may refer to audio data or data captured by the audio sensors that may be uncompressed. Alternatively, the raw audio data and the raw data may refer to audio data or data captured by the audio sensors that may be compressed but that otherwise remain unprocessed.

As illustrated in FIG. 2, audio sensor pair [204-1, 204-2] are disposed on a front area of the vehicle 102, audio sensor pair [204-3, 204-4] are disposed on a back area of the vehicle 102, audio sensor pair [204-5, 204-6] are disposed on a right side of the vehicle 102, and audio sensor pair [204-7, 204-8] are disposed on a left side of the vehicle 102. The front area, the back area, the left side and the right side are with respect to a direction of driving of the vehicle 102. Each of the audio sensor pairs can cover an area of 180-degree of angle, although audio sensors may be associated with any coverage range. In some examples, the audio sensor pair [204-1, 204-2] can cover the front area of the vehicle 102 in the 180-degree of angle, the audio sensor pair [204-3, 204-4] can cover the back area of the vehicle 102 in the 180-degree of angle, the audio sensor pair [204-5, 204-6] can cover the right side of the vehicle 102 in the 180-degree of angle, and the audio pair [204-7, 204-8] can cover the left side of the vehicle 102 in the 180-degree of angle. Thus, the audio sensors illustrated in FIG. 2 can cover all directions surrounding the vehicle 102, i.e., 360-degree of angle. As used herein, audio sensor pairs can be used to locate direction of arrival of audio signals by detecting a time different of arrival between the microphones of an audio emission.

It should be understood that the audio sensors and/or the speaker system(s) in FIG. 2 are for the purpose of illustration. A different number of audio sensors and/or speaker systems may be disposed on the vehicle 102. The positions of those audio sensors and/or speaker systems being disposed on the vehicle 102 may vary. The forming of audio sensor pairs or the forming of a set of audio sensors comprising more than two audio sensors may be determined in accordance with a size and/or the computing capacity of the vehicle computing device(s) 104.

In some examples, the vehicle computing device(s) 104 of the vehicle 102 may include the microphone component 106 that processes the audio data or audio signal representing the sound in an environment. The microphone component 106 may include one or more models such as a statistical model, a machine learned model, a heuristic model, or a combination thereof. In some examples, the microphone component 106 can be configured to "pre-process" the audio data (e.g., identify frequency information and/or intensity information associated with the audio data).

In some examples, the microphone component 106 may receive the audio data representing sound from the environment from one or more of the audio sensor(s) 204-1, 204-2, 204-3, 204-4, 204-5, 204-6, 204-7, and 204-8. The audio data may be associated with an object and/or represent audio data output by one of the speaker systems 208-1, 208-2, 208-3, and/or 208-4. The microphone component 106 can compare the audio data from one of the audio sensors to expected audio data sent from a respective speaker system (e.g., sound information associated with audio data detected by the audio sensors 204-1 and/or 204-2 can be compared to sound information associated with audio data output by the speaker system 208-1). Differences in the audio data relative to the expected audio data (e.g., differences in frequency and/or intensity) can be used to determine whether an audio sensor is properly calibrated and/or requires cleaning (e.g., the difference is below a difference threshold).

In various examples, a calibration operation can include the speaker system(s) 206 outputting an audio signal representing a range of frequencies and comparing the data (e.g., frequencies, amplitude, etc.) captured by one or more of the audio sensor(s) 204-1, 204-2, 204-3, 204-4, 204-5, 204-6, 204-7, and 204-8 to a frequency, amplitude, etc. of the audio signal. The calibration operation may also or instead be based at least in part on one or more audio signals output by another speaker(s) of the vehicle 102. For example, the vehicle 102 can output audio to communicate with a pedestrian or other object in an environment, and one or more of the audio sensor(s) can perform calibration (e.g., provide a calibration score) based on the audio output by the vehicle 102. Additional details of outputting sounds by a vehicle are described in U.S. patent application Ser. No. 15/986,739, filed May 22, 2018, entitled "Acoustic Notifications," which is incorporated herein by reference in its entirety and for all purposes.

In some examples, audio data detected by the audio sensor(s) can be used by a component of the vehicle computing device 104 to determine a direction of arrival. In such examples, the microphone component 106 may be redundant and/or implemented in parallel with one or more other models such as a Direction of Arrival (DoA) detection component (not shown). Examples of a DoA detection component are provided in U.S. patent application Ser. No. 16/836,605, titled "Distinguishing Between Direct Sounds and Reflected Sounds in an Environment," filed Mar. 31, 1020, the entirety of which is herein incorporated by reference.

FIG. 3A is an illustration of an example speaker system 300A for implementing the techniques described herein. For instance, the example speaker system 300A can include an enclosure 302 associated with a robotic device, such as the vehicle 102. In some examples, the enclosure 302 can include a first microphone 304, a second microphone 306, and a speaker 308. As illustrated in FIG. 3A, the first microphone 304 is associated with a first microphone cavity 310, the second microphone 306 is associated with a second microphone cavity 312, and the speaker 308 is associated with a front cavity 314 and a back cavity 316.

In some examples, the enclosure 302 can be integrated into a body or cavity of the vehicle 102 such that the first microphone cavity 310, the second microphone cavity 312, and the front cavity 314 include one or more holes to detect sound proximate the vehicle 102. That is, the enclosure 302 can be at least partially within the body of the vehicle and have a portion that is configured to receive audio signals in an environment of the vehicle. For example, the enclosure 302 can include a surface associated with the first microphone cavity 310, the second microphone cavity 312, and the front cavity 314 that includes one or more holes that act as a baffle, mesh, etc., on an exterior surface of the vehicle.

Generally, a size and shape of the enclosure 302 can affect frequencies output by the speaker 308, and the size and the shape of the enclosure 302 can be considered by the microphone component 106 during determinations of a frequency for use when outputting an audio signal from the speaker 308. Further, a size of the front cavity 314 and a size of the back cavity 316 can also be used to determine a frequency (e.g., a resonant frequency) usable to clean the surface of the first microphone cavity 310 and/or the surface of the second microphone cavity 312. For example, the microphone component 106 can determine a frequency to output an audio signal from the speaker 308 (e.g., a sinusoidal signal between 400 Hz and 1.6 kHz) that causes sufficient vibration to cause obstruction(s) to be removed from the one or more holes on the surface of the first microphone cavity 310 and/or the surface of the second microphone cavity 312.

In various examples, a volume of the enclosure 302 can be tuned to cause a pressure difference between the enclosure 302 and an outer surface of the vehicle 102 during operation of the speaker 308. The outer surface of the vehicle 102 can correspond to the surface of the enclosure 302 having the one or more holes. In various examples, the speaker 308 can operate at a frequency range that causes air pressure to push or vibrate obstacles on the outer surface for removal. The outer surface can include a plurality of holes that enable the microphone 304 and/or the microphone 306 to receive audio signals from the environment of the vehicle 102. For instance, rain in the holes of the outer surface can be cleaned based at least in part on the frequency range output by the speaker 308 inside the enclosure 302. By performing the cleaning techniques as described herein, a vehicle can improve microphone audio detection associated with objects in the environment (e.g., an emergency vehicle, a pedestrian, an animal, etc.).

In various examples, the microphone component 106 can cause the speaker 308 to emit a first frequency range to perform a cleaning operation, and a second frequency range to perform a calibration operation. For example, the speaker 308 can output a first frequency range that causes maximum air pressure and/or vibration based on a size of the enclosure 302, a size of the speaker 308, power output by the speaker 308, a size of the front cavity 314, a size of the back cavity 316, a size of the first microphone cavity 310, and/or a size of the second microphone cavity 312. The second frequency range can be output by the microphone component 106 to calibrate the first microphone 304 and/or the second microphone 306 (e.g., in a range of frequencies associated with an emergency vehicle or other object). In various examples, the microphone component 106 can cause the speaker 308 to output a first frequency range and compare audio signals from a microphone to determine a calibration score indicating a gain and/or a phase response of the microphone relative to the first frequency range output by the speaker 308. As previously described, the calibration score can be determined at various intervals including, for instance, weekly intervals or when the vehicle 102 receives maintenance.

In some examples, a portion of the enclosure 302 (e.g., the front microphone cavity 310, the front microphone cavity 312, the front cavity 314, the back cavity 316, the channel 320, etc.) can comprise actuators and/or a piezoelectric material to cause the portion to vibrate such as during a cleaning operation. For instance, the piezoelectrical material can be coupled to a mesh, grill, or outer surface of the enclosure 302 to cause the mesh, the grill, or the outer surface to vibrate when a signal is emitted from the speaker 308. In this way, cleaning an area around the microphone can be improved by vibrating an obstruction covering the area (e.g., rain or dust covering one or more holes), providing maximum air volume velocity, and/or vibrating the portion of the enclosure 302 (e.g., using the piezo electrical material to enable a mesh plate or other covering of the microphone(s) to vibrate).

In one specific example, sensor data associated with one or more sensors of an autonomous vehicle can determine presence of a weather event that includes a frozen obstruction (e.g., snow, freezing rain, sleet, etc.), and the microphone component 106 can cause a heating element to direct heat towards an area proximate the microphone. In this way, the heating element can cause the snow, ice, etc. to evaporate or otherwise be removed to improve operation of the microphone.

In some examples, the vehicle 102 can be bi-directional (a front region can change depending upon a direction of travel). By way of example and not limitation, detecting an obstruction on a microphone coupled to a front region or rear region of the vehicle 102 can cause the vehicle to operate in a single direction that minimizes reliance on the obstructed microphone to improve safety. For instance, in an environment with relatively strong wind and rain, sensors in the front region or the rear region can be impacted differently, and detecting an obstruction on the microphone in the front region or the rear region can be used to determine a direction of travel that optimizes performance of available microphones (or a cleaning operation, a calibration operation, etc.). In other words, the vehicle 102 can be controlled in the environment by determining a direction of travel for the vehicle 102 based at least in part on a differences in an audio signal sent from the speaker 308 and an audio signal detected by a microphone.

In some examples, sensor data from the vehicle computing device can be used to determine when to perform a test (e.g., a calibration operation and/or a cleaning operation). For example, vehicle data indicating a direction of travel, environmental data representing environmental conditions (e.g., wind, rain, snow, etc.), or other data can be used by the microphone component 106 to determine when to perform the test. In the example that the bi-direction vehicle operates in one direction due to wind and rain, a cleaning operation can be initiated by the microphone component 106 to clean the microphone(s) obstructed by rain. In some examples, the microphone component 106 can initiate a calibration operation to calibrate the microphone(s) before or after the cleaning operation.

As mentioned, the speaker 308 associated with the enclosure 302 and/or the enclosure 318 can be used to output audio in a frequency range that is configured to test operation of one or more of the microphones (e.g., the first microphone 310 and/or the second microphone 312). The vehicle 102 can include additional speaker(s) other than the speaker 308 such as speakers configured to send audio into the environment for communicating with an object (e.g., audio to signal presence of the vehicle 102 due to a lack of engine noise, warning signals, etc.). In some examples, the speaker 308 can be used for calibrating the one or more microphones during a first calibration process and the other speaker(s) can be used for calibrating during a second calibration process. For instance, the speaker 308 can perform a more detailed calibration of a microphone after, and based on, a first calibration performed using the additional speaker(s) of the vehicle 102.

FIG. 3B is another illustration of an example speaker system 300B for implementing the techniques described herein. For instance, the example speaker system 300B can include an enclosure 318 associated with a robotic device, such as the vehicle 102. In some examples, the enclosure 318 can include the first microphone 304, the second microphone 306, and the speaker 308. As illustrated in FIG. 3B, the first microphone 304 is associated with the first microphone cavity 310, the second microphone 306 is associated with the second microphone cavity 312, and the speaker 308 is associated with the back cavity 316 and a channel 320.

The channel 320 is configured to direct sound pressure generated by the speaker 308 towards at least one of: the first microphone 304 associated with the first microphone cavity 310 or the second microphone 306 associated with the second microphone cavity 312. For instance, the channel 320 can include a size, shape, or other configuration that causes sound pressure associated with an audio signal output by the speaker 308 towards holes on a surface of the first microphone cavity 310 and/or on a surface of the second microphone cavity 312. That is, the channel 320 can represent a conduit that directs sound pressure along a path that causes water or other liquid to be expelled outward away from the enclosure 318 (e.g., away from the surface of the first microphone cavity 310 and/or the surface of the second microphone cavity 312). Generally, the channel 320 can be configured to connect a volume of air between the first microphone cavity 310 and/or the second microphone 306, and the speaker 308.

In some examples, the channel 320 can selectively open and close a portion or partition represented by the dashed lines in FIG. 3B. In other words, the channel 320 can be associated with a device (not shown) that causes the portion or partition of the channel 320 to either of the first microphone cavity 310 or the second microphone cavity 312 to open and/or close depending upon which of the first microphone 304 or the second microphone 306 is being cleaned and/or calibrated. In some examples, additional sound pressure can be sent to one of the aforementioned microphone cavities by the microphone component 106 sending a signal to the device (e.g., an electrical device) that causes the portion corresponding to the dashed line to change from a first position that lets the audio signal pass to a second position that blocks at least some of the audio signal.

In some examples, the microphone component 106 can cause the speaker 308 to output a first audio signal into the channel 320 towards the microphone 304 and/or the second microphone 306, and detect, by the microphone, a second audio signal. In such examples, the microphone component 106 can determine a difference between the first audio signal and the second audio signal, and based at least in part on the difference, determine a probability that a liquid covers a portion of the first microphone cavity 310 or a portion of the second microphone cavity 312. The microphone component 106 can perform an action (e.g., initiate a cleaning operation and/or a calibration operation) based at least in part on the probability meeting or exceeding a difference threshold.

The channel 320 can, in some examples, include a single partition (not shown) changeable between a first position (e.g., an open state) that directs air pressure from the speaker 308 to the first microphone 304 and a second position (e.g., a closed state) that that directs the air pressure from the speaker 308 to the second microphone 306. In such examples, the microphone component 106 can selectively operate the partition to cause an output from the speaker 308 to be directed towards a desired microphone for cleaning and/or calibrating. If, for example, the first microphone 304 is associated with a lower calibration score than the second microphone 306, the partition can be arranged to cause additional air pressure to pass through the channel 320 to the first microphone 304 (versus both partitions being 'open'). Further, the microphone component 106 can selectively operate the partition to clean the first microphone 304 and the second microphone 306 iteratively for different period of time regardless of a calibration score. In this way, the channel 320 can connect the first microphone 304, the second microphone 306, and the speaker 308, for example.

In various examples, dimensions of the channel 320 can cause, during the cleaning operation, a pressure difference between the channel 320 and an opening associated with the first microphone cavity 310 and/or an opening associated with the second microphone cavity 312. The opening can represent one or more holes associated with a mesh, grill, baffle, or surface through which audio signals are designed to reach the microphone (e.g., from an exterior of the enclosure 318 or from the speaker 308). In some examples, the channel 320 comprises a shape and a size to cause the speaker 308 to emit a first frequency to calibrate the microphone and a second frequency different from the first frequency to remove debris from the opening associated with the first microphone cavity 310 and/or the second microphone cavity 312. The channel 320 can, for instance, produce a resonate frequency during output of an audio signal from the speaker 308 based at least in part on a size and/or a shape of hole(s) in each respective opening.

In some examples, the enclosure 302 and/or the enclosure 318 can be configured to maximize volume velocity of air during operation of the speaker 308. For example, a size, shape or other characteristic, of the enclosure can be designed to maximize air volume velocity caused by a resonant frequency output by the speaker 308. The speaker 308 can, in some examples, output one or more pulses across different frequencies or sweeps across a range of frequencies that includes the resonant frequency. The cleaning operation can include the speaker 308 outputting pulse(s) over different frequencies, a frequency sweep, or any combination, and at least one frequency can produce a maximum amplitude to provide a maximum air volume velocity based at least in part on characteristics of the enclosure. In some examples, the speaker 308 can output higher amplitude(s) for audio signal(s) used during the cleaning operation than audio signal(s) used during the calibration operation.

In various examples, a band of frequencies associated with the calibration operation can be wider than a band of frequencies associated with the cleaning operation. For example, the calibration operation can include the speaker 308 outputting a range of frequencies between 200 Hz and 8 kHz and the cleaning operation can include the speaker 308 outputting a range of frequencies between 100 Hz and 1.6 kHz though other example frequency bands are also contemplated.

In some examples, the microphone component 106 can determine the resonant frequency based at least in part on characteristics of the speaker 308 and the enclosure (or portions thereof). For example, the resonant frequency can be determined based on an impedance of a cavity (e.g., the front microphone cavity 310, the front microphone cavity 312, the front cavity 314, the back cavity 316, the channel 320, etc.), an impedance of an opening (e.g., one or more holes), and/or characteristics (e.g., mass, compliance, etc.) of the speaker 308. In various examples, the mass (e.g., weight of the voice coil, etc.) and the compliance (e.g., suspension system, spring system, etc.) of the speaker 308 can be considered by the microphone component 106 during resonant frequency determinations.

By implementing the enclosure 302 and/or the enclosure 318 as described herein, air pressure produced from the speaker 308 can reach an area of the microphone to cause rain or other particles on the area to be expelled by the air pressure (or vibrations thereof). In examples when the enclosure 302 and/or the enclosure 318 is included in or otherwise associated with an autonomous vehicle, determinations by a vehicle computing device can be improved by performing a cleaning operation and/or a calibration operation that improves accuracy of a microphone to detect signals in an environment.

Figure 4:
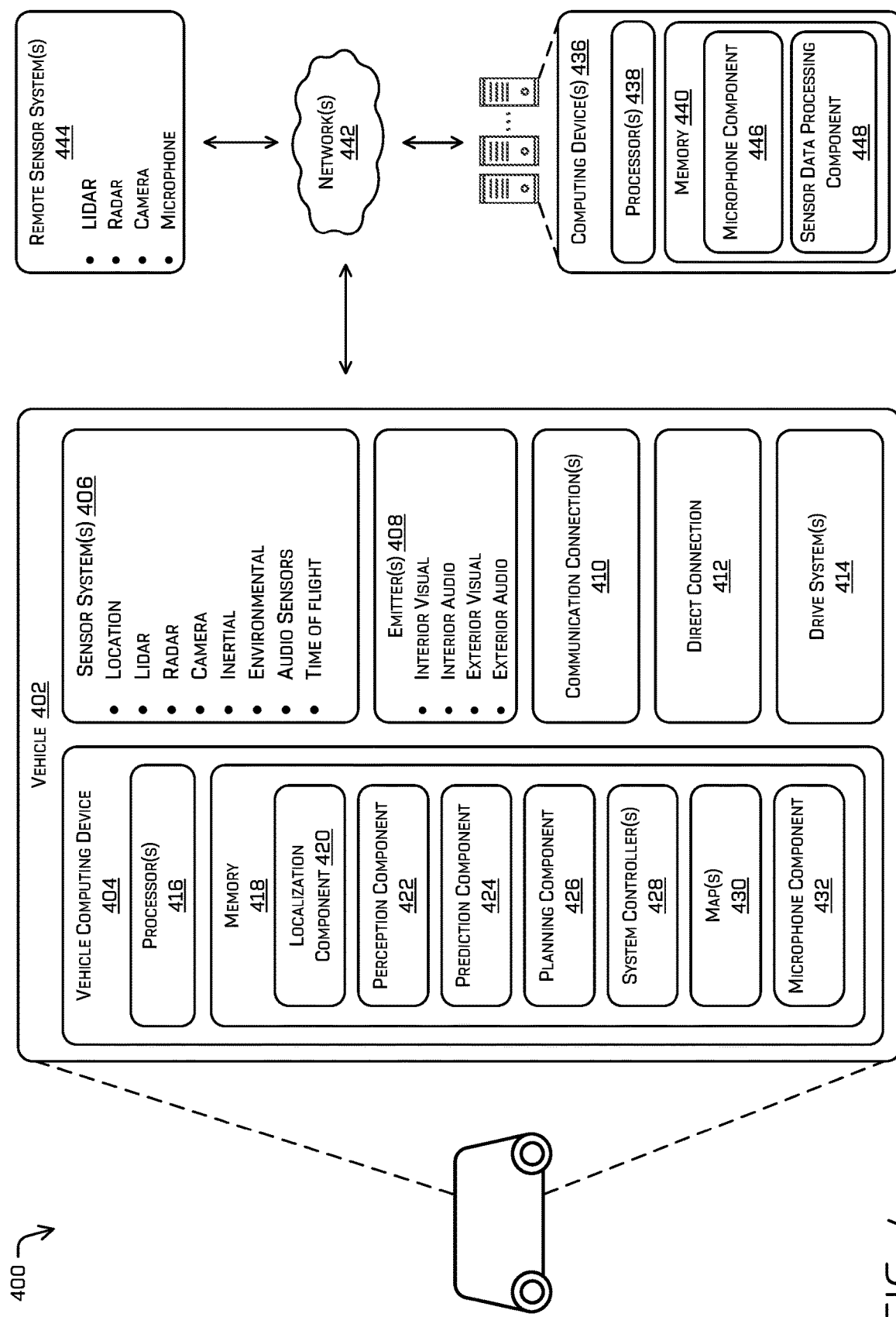
FIG. 4 is a block diagram of an example system for implementing the techniques described herein.

FIG. 4 illustrates a block diagram of an example system 400 for implementing the techniques described herein. In at least one example, the system 400 can include a vehicle 402, which can be the same vehicle as the vehicle 102 described above with reference to FIG. 1. In some examples, the vehicle 402 can include the speaker system(s) 206, the speaker 308, the enclosure 302, and/or the enclosure 318.

The vehicle 402 may include a vehicle computing device 404 (e.g., one or more devices), one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference for all purposes.

In the illustrated example, the memory 418 of the vehicle computing device 404 stores a localization component 420, a perception component 422, a prediction component 424, a planning component 426, one or more system controllers 428, one or more maps 430, and a microphone component 432. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the microphone component 432 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, RADAR data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In implementations, the perception component 422 can specifically identify articulated objects, such as articulated vehicles. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for articulated objects, vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., articulated objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can determine a trajectory for the vehicle 402 based at least in part on receiving data representing an output of the microphone component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally, or alternatively, the planning component 426 can determine the path for the vehicle 402 to follow based at least in part on data received from the microphone component 106 as described in FIGS. 1-3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a microphone component 432. The microphone component 432 may be configured to perform the functionality of the microphone component 106, including initiating a cleaning operation and/or a calibrating operation for one or more sensors of the sensor system(s) 406. In various examples, the microphone component 432 may receive one or more features associated with the detected object(s) from the perception component 422 and/or from the sensor system(s) 406. For instance, the microphone component 432 can receive data, e.g., sensor data, associated with audio produced by one or more objects in an environment. In some examples, the microphone component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the microphone component 432 could be part of the prediction component 424, the planning component 426, or other component(s) of the vehicle 402.

In various examples, the microphone component 432 may send output data (e.g., the output data 112) for use by the prediction component 424 and/or the planning component 426 to generate one or more predicted trajectories of the vehicle (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the microphone component 432 may be configured to determine whether a microphone of the vehicle 402 is functioning properly and send an indication of the microphone performance to another component of the vehicle computing device 404 for use in determining the one or more actions for the vehicle 402.

As can be understood, the components discussed herein (e.g., the localization component 420, the perception component 422, the prediction component 424, the planning component 426, the one or more system controllers 428, the one or more maps 430, and the microphone component 432 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive system(s), inertial sensors (e.g., inertial measurement units, accelerometers, gyroscopes, magnetometers, etc.) to measure orientation and acceleration of the drive system(s), cameras or other image sensors, ultrasonic sensors to acoustically detect objects in the surroundings of the drive system, LIDAR sensors, RADAR sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the microphone component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the microphone component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, and a sensor data processing component 448. In some examples, the map component 446 may generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the microphone component 432. In some examples, the sensor data processing component 448 may be configured to send raw sensor data to the vehicle computing device 404.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
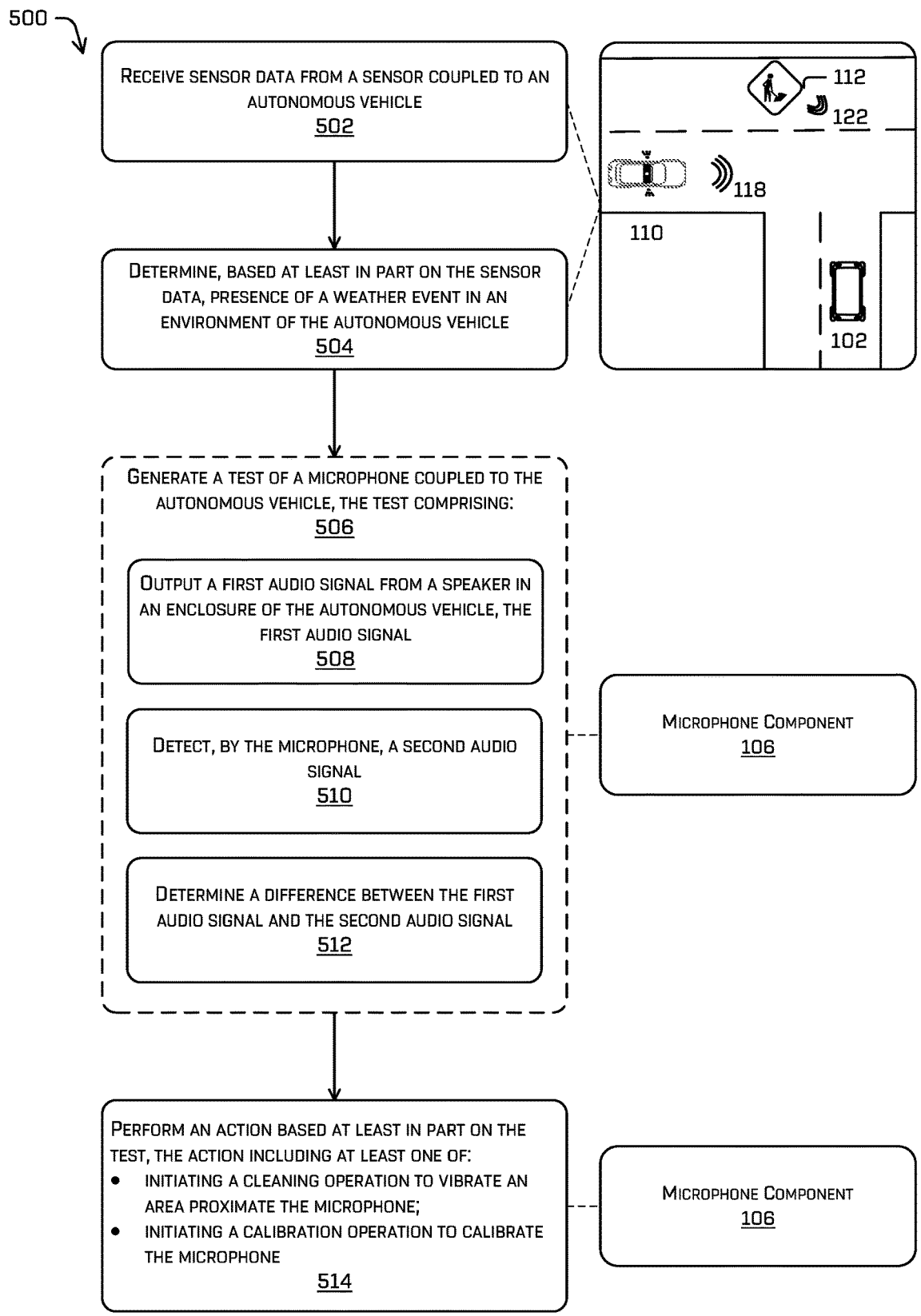
FIG. 5 is a flowchart depicting an example process for calibrating and/or cleaning an example audio sensor using an example speaker system.

FIG. 5 is a flowchart depicting an example process 500 for calibrating and/or cleaning an example audio sensor using an example speaker system. Some or all of the process 500 may be performed by one or more components in FIG. 1 or FIG. 4, as described herein. For example, some or all of process 500 may be performed by the vehicle computing device 104 and/or the vehicle computing device 404.

At operation 502, the process may include receiving sensor data from a sensor coupled to an autonomous vehicle. In some examples, the operation 502 may include capturing audio data by one or more microphones associated with the vehicle 102 or the vehicle 402. The sensor data may also or instead be associated with a sensor system(s) associated with the vehicle. In some examples, the sensor data can represent audio data output by a speaker system (e.g., the speaker system(s) 206, the speaker 308) and captured by an audio sensor, a first pair of audio sensors, multiple pairs of audio sensors, or a combination thereof, of the vehicle 102.

At operation 504, the process may include determining, based at least in part on the sensor data, presence of a weather event in an environment of the autonomous vehicle. In some examples, the operation 504 may include a component of a vehicle computing device determining that an environment of the vehicle includes a weather event (e.g., an event related to rain, mud, dirt, dust, snow, ice, etc.). In various examples, the weather event can affect audio data captured or otherwise generated by a microphone disposed on the vehicle. For example, rain can be detected in the environment using one or more sensor and the rain can at least partially cover an opening associated with the microphone (one or more holes of a mesh, baffle, grill or exterior of the vehicle).

At operation 506, the process may include generating a test of a microphone coupled to the autonomous vehicle. In some examples, the operation 506 may include the microphone component 106 initiating the test based at least in part on determining presence of the weather event. Generating the test can include the microphone component 106 generating a signal; to cause a speaker to output an audio signal.

At operation 508, the process may include outputting a first audio signal from a speaker in an enclosure of the autonomous vehicle, the first audio signal. In some examples, the operation 508 may include the microphone component 106 sending a signal to the speaker system (e.g., the speaker system(s) 206, the speaker 308) to cause the first audio signal to be output by the speaker system. The first audio signal can be associated with frequency information and/or sound intensity information. In some examples, the first audio signal can include a range of frequencies.

At operation 510, the process may include detecting, by the microphone, a second audio signal. In some examples, the operation 510 may include the microphone receiving sound output by the speaker system. The second audio signal can include different frequency information and/or sound intensity information than the first audio signal.

At operation 512, the process may include determining a difference between the first audio signal and the second audio signal. In some examples, the operation 512 may include the vehicle computing device can implement the microphone component 106 to determine a difference between first frequency information and/or sound intensity information associated with the first audio signal and second frequency information and/or sound intensity information associated with the second audio signal. In some examples, the microphone component 106 can compare a frequency, gain, phase, etc. of the first audio signal output by the speaker system to a frequency, gain, phase, etc. of the second audio signal.

At operation 514, the process may include performing an action based at least in part on the test, the action including at least one of: initiating a cleaning operation to vibrate an area proximate the microphone; or initiating a calibration operation to calibrate the microphone. In some examples, the operation 514 may include the microphone component 106 initiating a cleaning operation to vibrate an area proximate the microphone based at least in part on sending a signal to the speaker system indicating a frequency that causes a resonance in an area adjacent the microphone (e.g., a surface of the first microphone cavity 310 or the second microphone cavity 312). The cleaning operation can include causing the speaker system to output a resonant frequency (or vibrations thereof) towards the area of the microphone. In some examples, the cleaning operation can include causing air pressure to pass through a conduit (e.g. the channel 320) to cause an obstruction to be removed from the area of the microphone. The action may also or instead include the microphone component 106 initiating a calibration operation to calibrate the microphone. In such examples, the microphone component 106 can send a signal to the speaker system to cause the speaker system to output a frequency usable for calibrating the microphone.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A method comprising: receiving sensor data from a sensor coupled to an autonomous vehicle; determining, based at least in part on the sensor data, presence of a weather event in an environment of the autonomous vehicle; generating a test of a microphone coupled to the autonomous vehicle, the test comprising: outputting a first audio signal from a speaker in an enclosure of the autonomous vehicle, the first audio signal; detecting, by the microphone, a second audio signal; and determining a difference between the first audio signal and the second audio signal; performing an action based at least in part on the test, the action including at least one of: initiating a cleaning operation to vibrate an area proximate the microphone; or initiating a calibration operation to calibrate the microphone.

B: The method of paragraph A, wherein: a size of the enclosure is configured to cause a pressure difference between the enclosure and an outer surface of the autonomous vehicle, and the cleaning operation comprises operating the speaker to output a third audio signal to vibrate the area proximate the microphone based at least in part on the pressure difference.

C: The method of either paragraph A or B, wherein the microphone is configured to output data representing a test result of the microphone to a vehicle computing device, and further comprising: determining a microphone score indicating an impact of the weather event on performance of the microphone; and based at least in part on the microphone score, at least one of: causing the autonomous vehicle to navigate in the environment or calibrating the microphone.

D: The method of any one of paragraphs A-C, wherein the weather event is a rain event, and further comprising: determining an impact of the rain event on a mesh or baffle proximate the microphone, wherein the cleaning operation cleans at least a portion of the mesh or baffle proximate the microphone.

E: The method of any one of paragraphs A-D, wherein: the speaker is a first speaker, the microphone is a first microphone of a first microphone pair, the first microphone pair including the first speaker, the first microphone pair is placed on a first side of the autonomous vehicle, the autonomous vehicle includes a second microphone pair on a second side different from the first side, the second microphone pair including a second speaker, and the first and second microphone pairs are independently cleaned or calibrated using the respective speaker of the first or second microphone pair.

F: A system comprising: one or more processors; and one or more non-transitory computer-readable media storing computer-executable instructions that, when executed, cause the one or more processors to perform operations comprising: outputting a first audio signal from a speaker into a conduit connecting the speaker to a microphone; detecting, by the microphone, a second audio signal; determining a difference between the first audio signal and the second audio signal; determining, based at least in part on the difference, a probability associated with an obstruction covering an opening adjacent the microphone; and performing an action based at least in part on the probability meeting or exceeding a threshold, the action including at least one of: initiating a cleaning operation to remove at least a portion of the obstruction covering the opening; or initiating a calibration operation to calibrate the microphone to verify operation of the microphone.

G: The system of paragraph F, wherein a dimension of the conduit is determined to cause, during the cleaning operation, a pressure difference between the conduit and the opening adjacent the microphone.

H: The system of either paragraph F or G, wherein the conduit comprises a shape and a size to cause the speaker to emit a first frequency range to calibrate the microphone and a second frequency range to remove the obstruction from the opening adjacent the microphone.

I: The system of any one of paragraphs F-H, wherein: the opening adjacent the microphone comprises one of: an exterior surface of an autonomous vehicle or a mesh or a grill in front of the microphone, and the microphone outputs cleaning data or calibration data to a vehicle computing device to control the autonomous vehicle.

J: The system of any one of paragraphs F-I, the operations further comprising determining an impact of the obstruction on performance of the microphone.

K: The system of any one of paragraphs F-J, wherein initiating the cleaning operation to remove at least a portion of the obstruction covering the opening comprises generating a third audio signal at a particular amplitude to cause air pressure or a resonate frequency to remove the obstruction from the opening.

L: The system of paragraph K, wherein: the opening is a mesh comprising a plurality of holes, and a dimension of the conduit and a frequency of the third audio signal are determined to vibrate air through the mesh based at least in part on a resonant frequency associated with the mesh.

M: The system of any one of paragraphs F-L, the operations further comprising: determining a degree of obstruction coverage on an area in front of the microphone; and performing the cleaning operation or the calibrating operation based at least in part on the degree of obstruction coverage.

N: The system of any one of paragraphs F-M, wherein the microphone is a first microphone and, and the operations further comprising: detecting a third audio signal by a second microphone; comparing the second audio signal and the third audio signal; and performing the action is further based at least in part on the comparing.

O: The system of paragraph N, the operations further comprising: determining a first time of arrival to a first microphone and a second time of arrival to a second microphone, wherein comparing the second audio signal and the third audio signal comprises determining a difference between the first time of arrival associated with first microphone and the second time of arrival associated with the second microphone.

P: The system of either paragraph N or O, wherein the conduit connects the first microphone, the second microphone, and the speaker.

Q: The system of paragraph P, wherein the conduit comprises a first partition to the first microphone and a second partition to the second microphone, and the operations further comprising: causing the first partition to change from an open state to a closed state to send a third audio signal to the second microphone via the conduit, the third audio signal associated with the cleaning operation or the calibrating operation.

R: One or more non-transitory computer-readable media storing processor-executable instructions that, when executed by one or more processors, cause the one or more processors to perform operations comprising: sending a first audio signal to a speaker for outputting into a conduit connecting the speaker to a microphone; receiving, from the microphone, a second audio signal; determining a difference between the first audio signal and the second audio signal; determining, based at least in part on the difference, a probability associated with an obstruction covering an opening adjacent the microphone; and performing an action based at least in part on the probability meeting or exceeding a threshold, the action including at least one of: initiating a cleaning operation to remove at least a portion of the obstruction covering the opening; or initiating a calibration operation to calibrate the microphone to verify operation of the microphone.

S: The one or more non-transitory computer-readable media of paragraph R, wherein a dimension of the conduit is determined to cause, during the cleaning operation, a pressure difference between the conduit and the opening adjacent the microphone.

T: The one or more non-transitory computer-readable media of either paragraph R or S, wherein the conduit comprises a shape and a size to cause the speaker to emit a first frequency to calibrate the microphone and a second frequency different from the first frequency to remove debris from the opening adjacent the microphone.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer readable media storing computer executable instructions that, when executed, cause the one or more processors to perform operations comprising:
outputting a first audio signal from a speaker into a conduit connecting the speaker to a microphone;
detecting, by the microphone, a second audio signal;
determining a difference between the first audio signal and the second audio signal;
determining, based at least in part on the difference, a probability associated with an obstruction covering an opening adjacent the microphone; and
performing an action based at least in part on the probability meeting or exceeding a threshold, the action including at least one of:
initiating a cleaning operation to remove at least a portion of the obstruction covering the opening; or
initiating a calibration operation to calibrate the microphone to verify operation of the microphone.

2. The system of claim 1, wherein a dimension of the conduit is determined to cause, during the cleaning operation, a pressure difference between the conduit and the opening adjacent the microphone.

3. The system of claim 1, wherein the conduit comprises a shape and a size to cause the speaker to emit a first frequency range to calibrate the microphone and a second frequency range to remove the obstruction from the opening adjacent the microphone.

4. The system of claim 1, wherein:
the opening adjacent the microphone comprises one of: an exterior surface of an autonomous vehicle or a mesh or a grill in front of the microphone, and
the microphone outputs cleaning data or calibration data to a vehicle computing device to control the autonomous vehicle.

5. The system of claim 1, the operations further comprising determining an impact of the obstruction on performance of the microphone.

6. The system of claim 1, wherein initiating the cleaning operation to remove at least a portion of the obstruction covering the opening comprises generating a third audio signal at a particular amplitude to cause air pressure or a resonate frequency to remove the obstruction from the opening.

7. The system of claim 6, wherein:
the opening is a mesh comprising a plurality of holes, and
a dimension of the conduit and a frequency of the third audio signal are determined to vibrate air through the mesh based at least in part on a resonant frequency associated with the mesh.

8. The system of claim 1, the operations further comprising:
determining a degree of obstruction coverage on an area in front of the microphone; and performing the cleaning operation or the calibrating operation based at least in part on the degree of obstruction coverage.

9. The system of claim 1, wherein the microphone is a first microphone and, and the operations further comprising:
   detecting a third audio signal by a second microphone;
   comparing the second audio signal and the third audio signal; and
   performing the action is further based at least in part on the comparing.

10. The system of claim 9, the operations further comprising:
   determining a first time of arrival to a first microphone and a second time of arrival to a second microphone,
   wherein comparing the second audio signal and the third audio signal comprises determining a difference between the first time of arrival associated with first microphone and the second time of arrival associated with the second microphone.

11. The system of claim 9, wherein the conduit connects the first microphone, the second microphone, and the speaker.

12. The system of claim 11, wherein the conduit comprises a first partition to the first microphone and a second partition to the second microphone, and the operations further comprising:
   causing the first partition to change from an open state to a closed state to send a third audio signal to the second microphone via the conduit, the third audio signal associated with the cleaning operation or the calibrating operation.

13. One or more non-transitory computer-readable media storing processor-executable instructions that, when executed by one or more processors, cause the one or more processors to perform operations comprising:
   sending a first audio signal to a speaker for outputting into a conduit connecting the speaker to a microphone;
   receiving, from the microphone, a second audio signal;
   determining a difference between the first audio signal and the second audio signal;
   determining, based at least in part on the difference, a probability associated with an obstruction covering an opening adjacent the microphone; and
   performing an action based at least in part on the probability meeting or exceeding a threshold, the action including at least one of:
   initiating a cleaning operation to remove at least a portion of the obstruction covering the opening; or
   initiating a calibration operation to calibrate the microphone to verify operation of the microphone.

14. The one or more non transitory computer readable media of claim 13, wherein a dimension of the conduit is determined to cause, during the cleaning operation, a pressure difference between the conduit and the opening adjacent the microphone.

15. The one or more non transitory computer readable media of claim 13, wherein the conduit comprises a shape and a size to cause the speaker to emit a first frequency to calibrate the microphone and a second frequency different from the first frequency to remove debris from the opening adjacent the microphone.

16. A method comprising:
   sending a first audio signal to a speaker for outputting into a conduit connecting the speaker to a microphone;
   receiving, from the microphone, a second audio signal;
   determining a difference between the first audio signal and the second audio signal;
   determining, based at least in part on the difference, a probability associated with an obstruction covering an opening adjacent the microphone; and
   performing an action based at least in part on the probability meeting or exceeding a threshold, the action including at least one of:
   initiating a cleaning operation to remove at least a portion of the obstruction covering the opening; or
   initiating a calibration operation to calibrate the microphone to verify operation of the microphone.

17. The method of claim 16, wherein the conduit comprises a shape and a size to cause the speaker to emit a first frequency range to calibrate the microphone and a second frequency range to remove the obstruction from the opening adjacent the microphone.

18. The method of claim 16, further comprising determining an impact of the obstruction on performance of the microphone.

19. The method of claim 16, wherein initiating the cleaning operation to remove at least a portion of the obstruction covering the opening comprises generating a third audio signal at a particular amplitude to cause air pressure or a resonate frequency to remove the obstruction from the opening.

20. The method of claim 16, further comprising:
   determining a degree of obstruction coverage on an area in front of the microphone; and
   performing the cleaning operation or the calibrating operation based at least in part on the degree of obstruction coverage.

\* \* \* \* \*